United States Patent
Bystricky et al.

(10) Patent No.: US 7,055,140 B2
(45) Date of Patent: May 30, 2006

(54) SOFTWARE BREAKPOINTS IMPLEMENTATION VIA SPECIALLY NAMED FUNCTION

(75) Inventors: Juraj Bystricky, Richmond (CA); Tatiana Pavlovna Kadantseva, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 631 days.

(21) Appl. No.: 10/136,163

(22) Filed: May 1, 2002

(65) Prior Publication Data

US 2003/0208745 A1 Nov. 6, 2003

(51) Int. Cl.
G06F 9/44 (2006.01)

(52) U.S. Cl. .......................... 717/129; 714/35; 714/38; 712/227

(58) Field of Classification Search ........ 717/124–135, 717/154, 158, 140; 714/34, 35, 38; 712/227, 712/244
See application file for complete search history.

(56) References Cited

U.S. PATENT DOCUMENTS

| | | | | |
|---|---|---|---|---|
| 5,371,894 A | | 12/1994 | DiBrino | 714/34 |
| 5,651,111 A | * | 7/1997 | McKeeman et al. | 714/38 |
| 5,819,093 A | | 10/1998 | Davidson et al. | 717/126 |
| 5,835,699 A | * | 11/1998 | Kimura | 714/34 |
| 5,838,975 A | * | 11/1998 | Abramson et al. | 717/129 |
| 5,956,512 A | * | 9/1999 | Simmons et al. | 717/128 |
| 5,970,245 A | | 10/1999 | Poteat et al. | 717/128 |
| 6,026,235 A | | 2/2000 | Shaughnessy | 717/127 |
| 6,042,614 A | | 3/2000 | Davidson et al. | 717/116 |
| 6,202,199 B1 | | 3/2001 | Wygodny et al. | 717/125 |
| 6,216,237 B1 | * | 4/2001 | Klemm et al. | 714/38 |
| 6,249,907 B1 | | 6/2001 | Carter et al. | 717/129 |
| 6,256,777 B1 | * | 7/2001 | Ackerman | 717/129 |
| 6,434,742 B1 | * | 8/2002 | Koepele, Jr. | 717/140 |
| 6,681,280 B1 | * | 1/2004 | Miyake et al. | 710/261 |
| 6,754,891 B1 | * | 6/2004 | Snyder et al. | 717/128 |
| 2002/0129336 A1 | * | 9/2002 | Bolding et al. | 717/124 |

FOREIGN PATENT DOCUMENTS

EP 0 992 906 A2 4/2000

OTHER PUBLICATIONS

Doughman, Reference Guide for D-Bug 12 Version 2.1.x, Sep. 1999, Motorola Semiconductor.*

* cited by examiner

Primary Examiner—Antony Nguyen-Ba
(74) Attorney, Agent, or Firm—Mark P. Watson

(57) ABSTRACT

A method for debugging including the steps of receiving code having a software breakpoint function therein, running the code for the purpose of debugging, monitoring the code to detect the presence of the software breakpoint function, recognizing the software breakpoint function, determining an action to be performed based on the software breakpoint function, and implementing the action. The present invention also includes an apparatus for implementing the method for debugging and a medium embodying a program of instructions for execution by a device to perform the method for debugging.

18 Claims, 3 Drawing Sheets though the use of the specially named void function may require minor changes to the compiler. The debugging tool 104 also provides safer operation when the debugging tool 104 is not running, as the specially named void function cannot crash or hang the application program 102.

SOFTWARE BREAKPOINTS IMPLEMENTATION VIA SPECIALLY NAMED FUNCTION

BACKGROUND OF THE INVENTION

Background of Invention

The present invention is directed to a method and apparatus that implements software breakpoints using a specially named void function as a software breakpoint function.

A useful technique for testing software is to place one or more breakpoints at various places in the instructions. A breakpoint halts the sequential execution of the instructions at the predetermined point. Alternatively, a breakpoint interrupts program execution when a read or write operation is performed on a particular variable. Breakpoints are placed in the code at locations specified by the programmer. By specifying a breakpoint, the programmer can verify that a section of the program is operating correctly or identify the point at which an erroneous variable value is created. For example, by setting a breakpoint near a possibly flawed section of code, the programmer, upon reaching the breakpoint, can single-step forward through the section of the code to evaluate the cause of the problem.

Typically, the breakpoint instruction is a special processor instruction, such as an assembly code software interrupt. In operation, a debugging tool monitors program execution. When the special processor instruction causes the software interrupt, the debugging tool detects and intercepts the interrupt, stopping program execution.

One disadvantage of the traditional method of implementing a breakpoint stems from the fact that a software interrupt requires an interrupt-handling procedure, which is provided by the debugging tool. If the debugging tool is not running, however, the required interrupt-handling procedure is unavailable to handle the interrupt. In this situation, the operating system may handle the interrupt. In some cases, the operating system handles the interrupt by performing a reset operation, i.e., the system "crashes." In other cases, the operating system cannot handle the interrupt, and the system simply "hangs."

The traditional method of implementing a breakpoint has another disadvantage. The particular special processor instruction that is invoked by the breakpoint is unique to the central processing unit ("CPU"). In other words, a breakpoint that works with an INTEL® processor will probably not work with a MOTOROLA® or IBM® processor because the processors have different software interrupt instructions. This limits the portability of the software.

U.S. Pat. No. 6,249,907 to Carter et al. (the "Carter reference") is directed to a system for debugging a computer program in which a user specifies breakpoint types prior to compiling the computer program. A breakpoint type may be, for example, a statement that references a particular variable, a middleware statement, a file input/output statement, or a verb statement. During compilation, the compiler inserts a hook function call in the object code at each instance of a statement corresponding to a specified breakpoint type. When the program processes a hook function call, execution of the program stops and control is transferred to the debugger. The Carter reference discloses that the computer program being tested makes a call (and may pass parameters) to the debugger. In other words, the Carter computer program is "aware" that it is being debugged. Because some bugs occur only under specific execution conditions, arising especially in time dependent or multi-threaded applications, disruption of program execution by the Carter debugger may mask a bug that would occur only during "normal" execution. Further, the Carter reference does not teach or suggest a solution to the problem of processing a breakpoint interrupt when the debugger is not running and is, therefore, unable to handle the interrupt. In addition, each compiler that uses the Carter method must be modified to insert hook function calls in the object code.

BRIEF SUMMARY OF THE INVENTION

The present invention is directed to a method and apparatus that implement a software breakpoint using a specially named void function as a software breakpoint function. Advantages of the invention include minimal modification of the application program, portability between different types of CPUs, and safe operation of the application program when the debugging tool is not running.

A method for debugging preferably includes the steps of receiving code having a software breakpoint function therein, running the code for the purpose of debugging, monitoring the code to detect the presence of the software breakpoint function, recognizing the software breakpoint function, determining an action to be performed based on the software breakpoint function, and implementing the action. Preferably the method includes the steps of returning to the code and continuing to monitor the code. The code may be programmed by inserting the software breakpoint function into the code.

The present invention may also include an apparatus for implementing the method for debugging. Further, the present invention may include a medium readable by a device embodying a program of instructions for execution by the device to perform the method for debugging.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
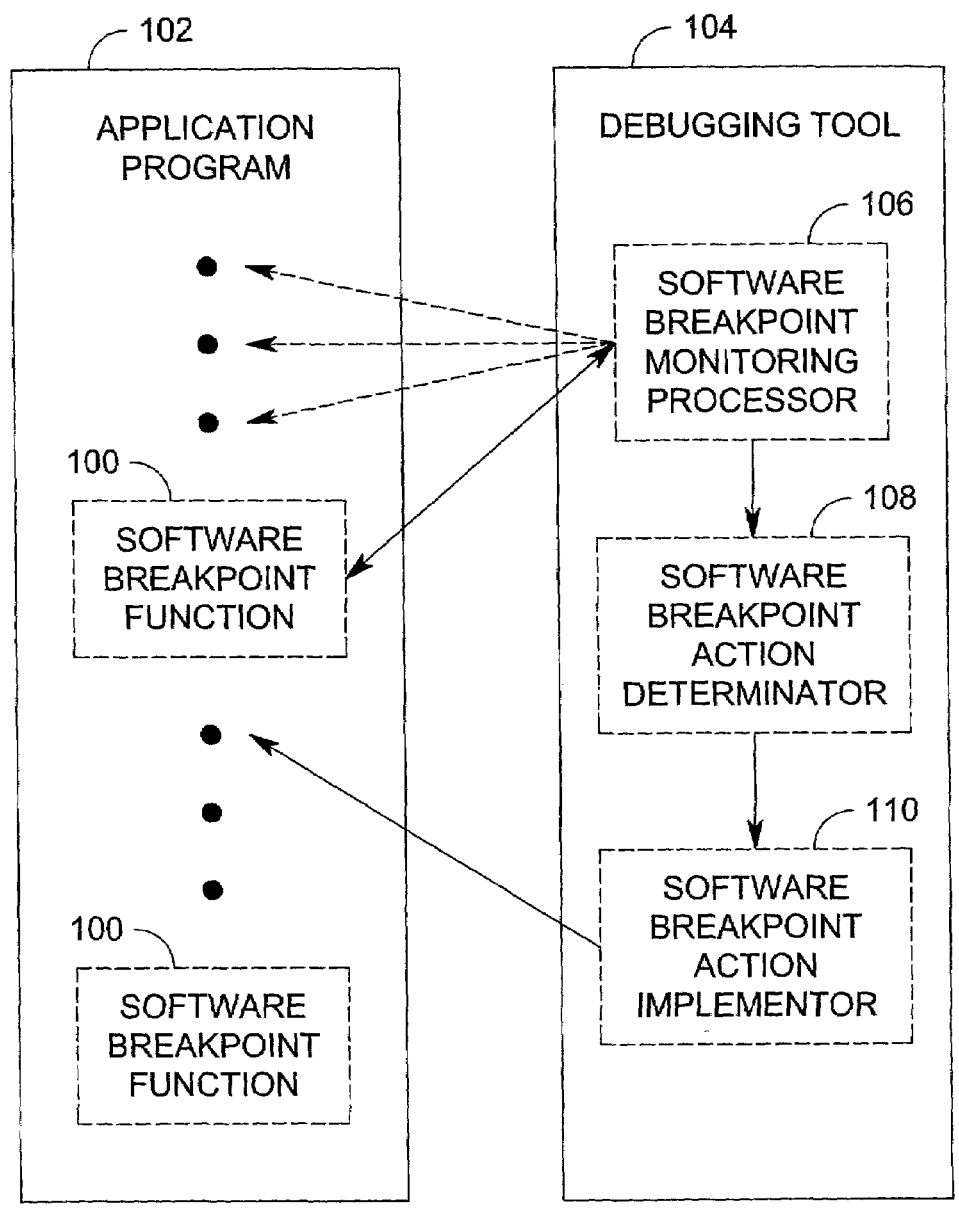
FIG. 1 is a block diagram of the application and debugging tool of the present invention.

The present invention is directed to a method and apparatus that uses a software breakpoint function 100, which may be a specially named void function, to implement a software breakpoint. Implementation of the present invention requires only minimal modification of the application program 102 into which software breakpoints are desired. Instead, the present invention relies on a debugging tool 104 that, in one preferred embodiment, includes a software breakpoint monitoring processor 106, a software breakpoint action determinator 108, and a software breakpoint action implementor 110. Using the debugging tool 104 of the present invention offers portability between different types of CPUs and safe operation of the application program 102 when the debugging tool 104 is not running.

The term "function" is generally defined as a section of a program that performs a specific task. When a function call is executed, program control transfers to the section of the program where the function is located. After the function executes, program control returns to the next statement following the function call. Although the present invention has been discussed in terms of "functions," it should be noted that any type of subprogram could be used to implement the invention as long as the particular programming language allowed for a void or empty subprogram to be called. Alternative exemplary subprograms include subroutines, procedures, macros, or any type of subprogram.

The term "void function" is used to describe any function that does nothing. For example, although the term "void function" as it is used in "C" is generally defined as a function that has no input or output arguments, if a C void function did nothing when it was run it would fall into the category of a void function for the present invention. If, however, a C void function did something (e.g. performed a step) it would not fall into the category of a void function for the present invention. In other words, for the preferred embodiment of the present invention, a void function preferably does nothing.

For the purpose of illustrating the present invention, the invention will be discussed in source code terms. However, in actual implementation, the debugging tool 104 would probably be executing and monitoring object code.

For the purpose of illustrating the present invention, several exemplary programs and functions will be used. Although the exemplary programs are written in ADA (or loosely based on the ADA programming language), the present invention could be applied to programs that were written in any programming language. "Function Code 1: function MAX" is an exemplary function that finds the larger of two integers. "Program Code 1: MAX_DEMO" is an exemplary program that uses function MAX to find the largest of three integers.

```
Function Code 1: function MAX
function MAX (X,Y : INTEGER) return INTEGER is
begin
    if X > Y then
        return X;
    else
        return Y;
    end if;
end MAX;
Program Code 1: MAX_DEMO
with TEXT_IO, BASIC_NUM_IO;
use TEXT_IO, BASIC_NUM_IO;
procedure MAX_DEMO is
    A, B, C, M : INTEGER
    function MAX (X,Y : INTEGER) return INTEGER is
    begin
        if X > Y then
            return X;
        else
            return Y;
        end if;
    end MAX;
begin
    loop
        PUT_LINE ("Enter three whole numbers");
        Exit when END_OF_FILE;
        GET(A); GET(B); GET(C);
        M := MAX(A, B);
        M := MAX(M, C);
        PUT("The biggest of them is ");
```

```
-continued
        PUT(M); NEW_LINE;
    end loop;
end MAX_DEMO;
```

A software breakpoint function 100 of the present invention itself does not perform an operation. That is, the software breakpoint function 100 of the present invention is a void function. For example, one exemplary software breakpoint function 100 might be named "DEBUG TERMINATE." As a second example, a software breakpoint function 100 might be named simply "SOFTWARE BREAKPOINT." These are shown in "Function Code 2: function DEBUG TERMINATE" and "Function Code 3: function SOFTWARE BREAKPOINT."

```
Function Code 2: function DEBUG TERMINATE
function DEBUG TERMINATE ( ) is
begin
end DEBUG TERMINATE;
Function Code 3: function SOFTWARE BREAKPOINT
function SOFTWARE BREAKPOINT ( ) is
begin
end SOFTWARE BREAKPOINT;
```

"Program Code 2: MAX_DEMO_DEBUG" is a modified version of Program Code 2: MAX_DEMO that includes software breakpoint functions 100 "Function Code 2: function DEBUG TERMINATE" and "Function Code 3: function SOFTWARE BREAKPOINT." If a programmer were to try to debug MAX_DEMO, then MAX_DEMO would be modified to look something like MAX_DEMO_DEBUG.

```
Program Code 2: MAX_DEMO_DEBUG
with TEXT_IO, BASIC_NUM_IO;
use TEXT_IO, BASIC_NUM_IO;
procedure MAX_DEMO_DEBUG is
    A, B, C, M : INTEGER
    function DEBUG TERMINATE ( ) is
    begin
    end DEBUG TERMINATE;
    function SOFTWARE BREAKPOINT ( ) is
    begin
    end SOFTWARE BREAKPOINT;
    function MAX (X,Y : INTEGER) return INTEGER is
    begin
        if X > Y then
            return X;
            SOFTWARE BREAKPOINT;
        else
            return Y;
        end if;
    end MAX;
begin
    loop
        PUT_LINE ("Enter three whole numbers");
        Exit when END_OF_FILE;
        GET(A); GET(B); GET(C);
        SOFTWARE BREAKPOINT;
        M := MAX(A, B);
        M := MAX(M, C);
        SOFTWARE BREAKPOINT;
        PUT("The biggest of them is ");
        PUT(M); NEW_LINE;
        DEBUG TERMINATE;
    end loop;
end MAX_DEMO_DEBUG;
```

As shown in MAX_DEMO_DEBUG, multiple software breakpoint functions 100 and multiple types of software breakpoint functions 100 (e.g. SOFTWARE BREAKPOINT and DEBUG TERMINATE) may be inserted into each program. Further, software breakpoint functions may be inserted into subprograms (such as function MAX (X,Y: INTEGER) which includes the software breakpoint function SOFTWARE BREAKPOINT.

A programmer desiring to use the present invention to debug an application program would take his programming code (e.g. MAX_DEMO) and define one or more software breakpoint functions 100 as void functions (e.g. SOFTWARE BREAKPOINT and DEBUG TERMINATE). Alternatively, a programming language could include a library of predefined software breakpoint functions 100.

In one preferred embodiment, the debugging tool 104 would recognize any predefined void functions having specific names as a software breakpoint function 100. In another alternative preferred embodiment, the debugging tool 104 could be modified to accept user defined void functions as a software breakpoint function 100. In yet another preferred embodiment, the debugging tool 104 would recognize any void function, and check to see if it is a software breakpoint function 100. In still yet another alternative preferred embodiment, the debugging tool 100 could have a combination of the aforementioned possibilities.

The programmer would then insert at least one software breakpoint function (e.g. SOFTWARE BREAKPOINT and DEBUG TERMINATE) into the application program (e.g. MAX_DEMO) as is shown in MAX_DEMO_DEBUG.

The action performed by the debugging tool 104 may be any known debugging procedure, such as halting, pausing, terminating, or single-stepping program execution. In an interactive debugging system, a graphical user interface may be used to allow the programmer to monitor, control, and/or have input in the debugging process. In one preferred embodiment the software breakpoint functions 100 are given specific names that are associated with a desired breakpoint action. When the debugging tool 104 detects that the named software breakpoint function 100 has been called, the debugging tool 104 performs the desired breakpoint action. The action performed by the debugging tool 104 may be any known debugging procedure, such as halting, pausing, or single-stepping program execution. If the desired breakpoint action was halting, the function might be named SOFTWARE BREAKPOINT HALTING or just HALTING. Similarly, if the desired breakpoint action was single-stepping program execution, the function might be named SOFTWARE BREAKPOINT SINGLE or just SINGLE-STEPPING PROGRAM EXECUTION. Although for ease of understanding code these meaningful names would be preferable, for complicated programs or just for consistency, alternative non-meaningful names (e.g. codes or numbers) could be used.

Once the programmer has programmed his application program, the application program may be compiled (converting the source code to object code). Significantly, because the software breakpoint functions 100 are implemented as standard functions for a particular type of program, the compiler would compile the software breakpoint functions 100 as it would any other function. The compiled software breakpoint function 100, however, would perform no action.

Although most compilers include a debugging tool 104 that runs substantially simultaneously with the compiler, for purposes of this invention the debugging tool 104 will be discussed as separate from the compiler. Alternative embodiments could include a combined compiler and debugging tool 104.

Turing to FIG. 1, the present invention is directed to a debugging tool 104 for debugging an application program 102 having at least one software breakpoint function 100. The debugging tool 104, in one preferred embodiment, includes a software breakpoint monitoring processor 106, a software breakpoint action determinator 108, and a software breakpoint action implementor 110. The software breakpoint monitoring processor 106 monitors the application program 102 and recognizes the software breakpoint function 100. As shown in FIG. 1, the software breakpoint monitoring processor 106 monitors each line of code until the software breakpoint function 100 is detected. Using Program Code 2: MAX_DEMO_DEBUG as an example, the software breakpoint monitoring processor 106 of the debugging tool 104 would start monitoring as the main program (MAX_DEMO_DEBUG) began. Since the code line "loop" is not a software breakpoint function 100, the application program 102 would execute that line of code. Since the code line "PUT_LINE ("Enter three whole numbers");" is not a software breakpoint function 100, the application program 102 would execute that line of code. Since the code line "Exit when END_OF_FILE;" is not a software breakpoint function 100, the application program 102 would execute that line of code. Since the code line "GET(A); GET(B); GET(C);" is not a software breakpoint function 100, the application program 102 would execute that line of code. However, when the software breakpoint monitoring processor 106 came to the code line "SOFTWARE BREAKPOINT;" the software breakpoint monitoring processor 106 would recognize it as a software breakpoint function 100 and call the software breakpoint action determinator 108.

The software breakpoint action determinator 108 would then determine an action to be performed based on the software breakpoint function. For example, the software breakpoint action determinator 108 may determine that the software breakpoint function 100 is an instruction for halting, pausing, terminating, or single-stepping program execution. The software breakpoint action determinator 108 may be a table lookup in which the specially named function is used to look-up the appropriate action. Alternatively, the software breakpoint action determinator 108 may use the specially named function to call a function within the debugging tool 104. Upon determining the action to be performed, the software breakpoint action determinator 108 provides instructions to the software breakpoint action implementor 110.

The software breakpoint action implementor 110, upon receiving the instructions from the software breakpoint action determinator 108, implements the action. For example, if the software breakpoint action implementor 110 could perform any any known debugging procedure, such as halting, pausing, terminating, or single-stepping program execution.

It should be noted that in one preferred embodiment the software breakpoint monitoring processor 106 and the software breakpoint action determinator 108 are significantly interconnected and may be implemented by a single device or as a single step. For example, the software breakpoint monitoring processor 106 may use the a lookup table in the software breakpoint action determinator 108 to determine whether a particular line of code is a software breakpoint function 100.

It should be noted that in one preferred embodiment the software breakpoint action determinator 108 and the software breakpoint action implementer 110 are implemented by a single device or as a single step. For example, in the embodiment in which the specially named function is used to call a function within the debugging tool 104 which is immediately executed, the software breakpoint action determinator 108 and the software breakpoint action implementer 110 would essentially be carried out simultaneously.

Figure 2:
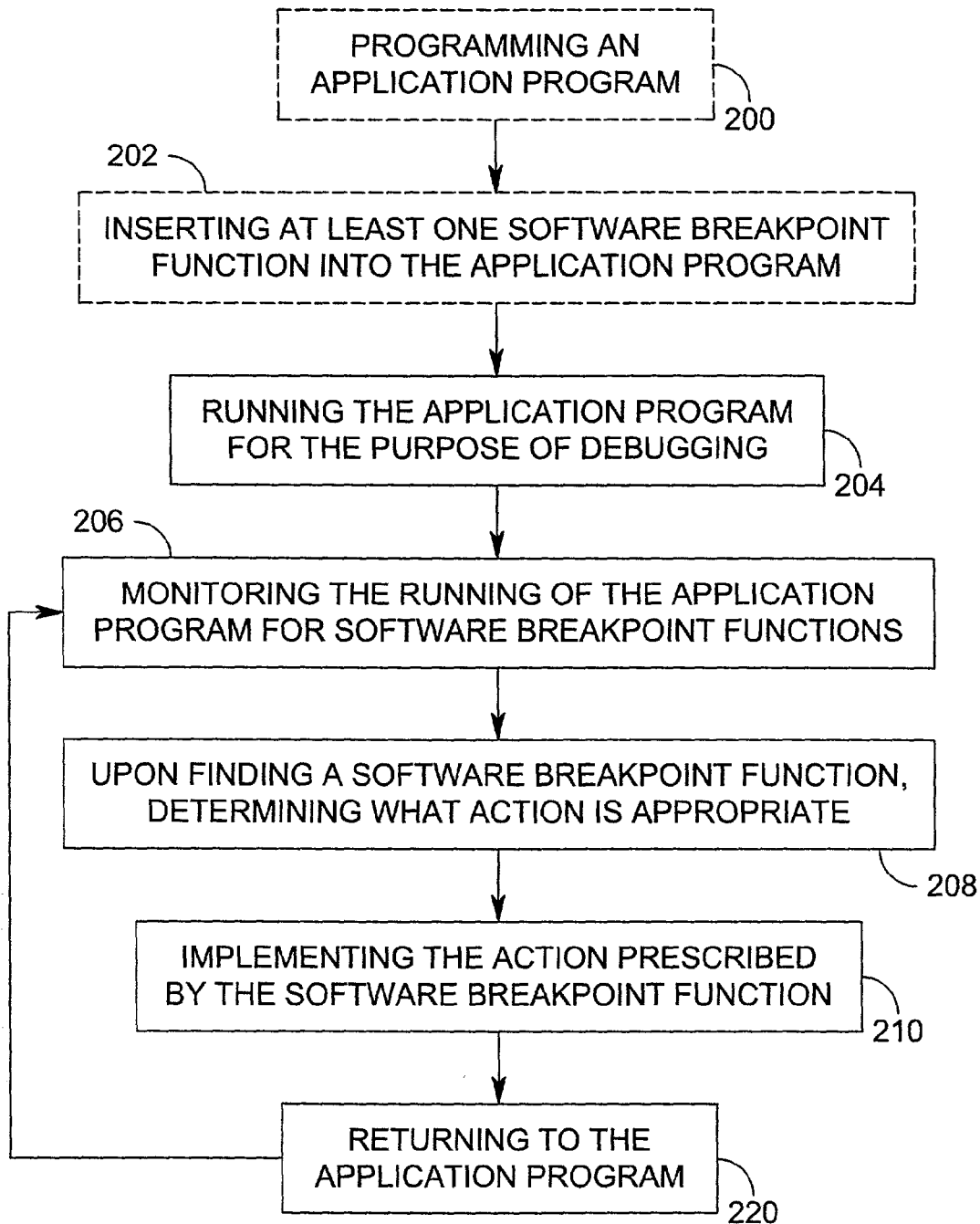
FIG. 2 is a flowchart of a method for using software breakpoints with a specially named void function of the present invention.

Turning to FIG. 2, a method according to the present invention begins with two optional steps: programming an application program 200 and inserting at least one software breakpoint function into the application program 202. These steps, which are discussed above in detail, are optional because code may be used that has the software breakpoint functions preprogrammed. The next step is running the application program for the purpose of debugging 204. As set forth above, this may include compiling and debugging either separately or in combination. While the application program is running, the software breakpoint monitoring processor is monitoring the application program for software breakpoint functions such as a specially named function 206. Upon recognizing a software breakpoint function or specially named function, the next step is determining an action to be performed based on the software breakpoint function or specially named function 208. The action prescribed by the software breakpoint function or specially named function is then implemented 210. Finally, the debugging program returns to the application program 220 and continues the monitoring.

Figure 3:
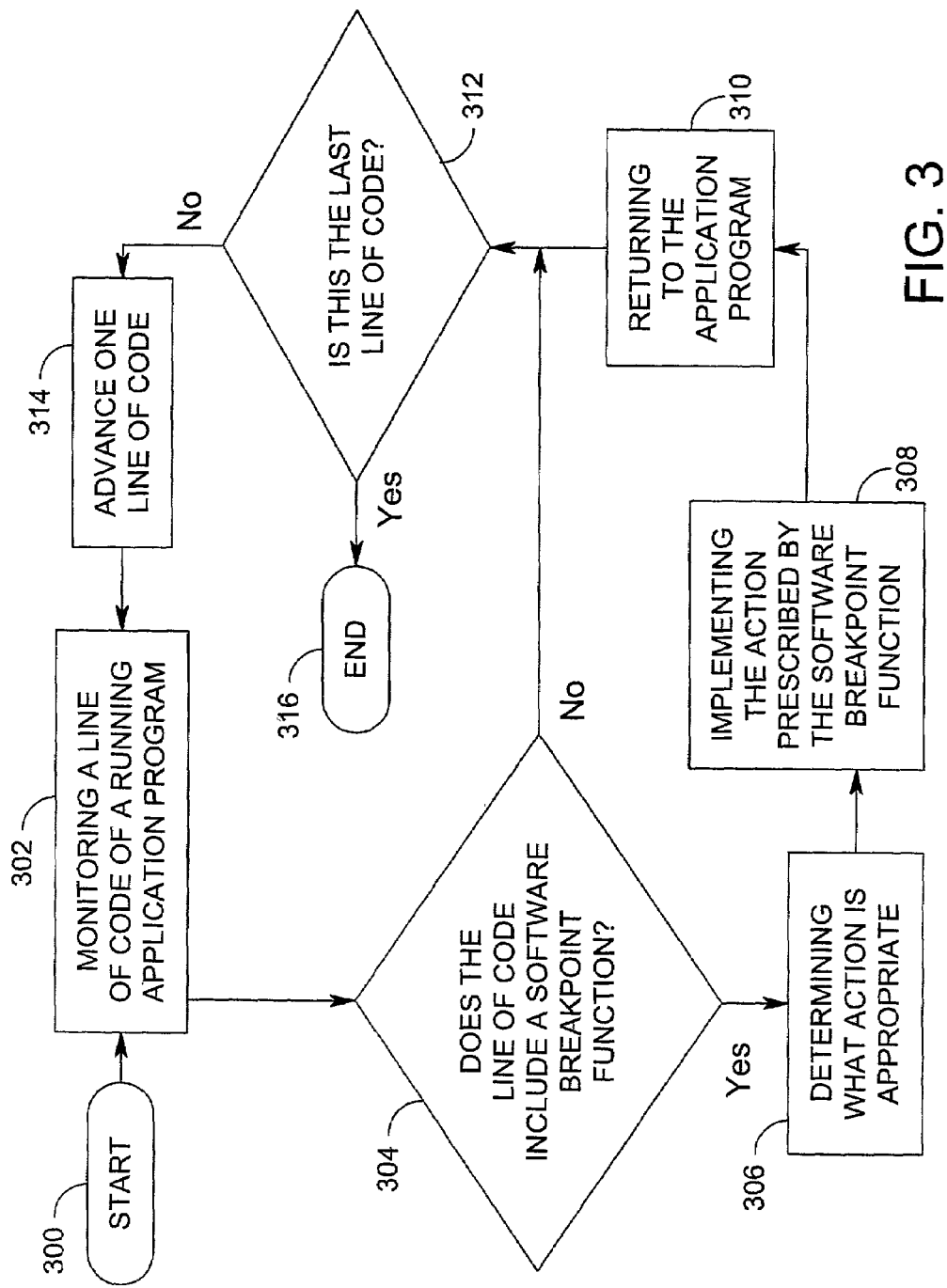
FIG. 3 is a flowchart of a method used by a debugging tool of the present invention using software breakpoints with a specially named or void function.

FIG. 3 shows the step-by-step process used by the debugging tool 104 to implement one preferred embodiment of the present invention. Specifically, the debugging process is started 300 and a first line of code of the running application program is monitored 302. The debugging tool then determines whether the first line of code includes a software breakpoint function 304. If the first line of code includes a software breakpoint function, the debugging tool determines what action is appropriate 306, implements the action prescribed by the software breakpoint function 308, and returns to the application program 310. If the first line of code does not include a software breakpoint function or if the debugging tool returns to the application program, the debugging tool then looks to whether the line is the last line of code in the application program 312. If it is, the debugging process ends 316. If it is not the last line of code, then the process advances once line of code 314 and the monitoring processes begins for the new line of code 302.

If the debugging tool 104 is not running, no operation is performed by the named software breakpoint function 100, and program control returns to the next statement following the function call. This is one of the advantages of using a function to implement a software breakpoint. Specifically, the inadvertent failure of a programmer to remove a software breakpoint function 100 after debugging does not result in harmful consequences. As an example, if Program Code 2: MAX_DEMO_DEBUG were running and the debugging tool 104 was not turned on, the code lines "loop," "PUT_LINE ("Enter three whole numbers");," "Exit when END_OF_FILE;," and "GET(A); GET(B); GET(C);" would run normally. When the code line with the software breakpoint monitoring function 100 "SOFTWARE BREAKPOINT;" was encountered, the function SOFTWARE BREAKPOINT ( ) would be called. SOFTWARE BREAKPOINT ( ) would then run, but since it is a void function with no actions to execute, program control would return to the next line of code ("M:=MAX(A, B);") following the function call.

The present invention may be implemented as a medium readable by a device such as a processor or other computing device. The medium may be any storage device including, but not limited to software, hardware, firmware, or any device capable of embodying a program of instructions for execution by the device to perform a method for debugging an application program. In one preferred embodiment of the present invention the medium has instructions thereon for receiving code having a software breakpoint function, running the code for the purpose of debugging, monitoring the code to detect the presence of the software breakpoint function, recognizing the software breakpoint function, determining an action to be performed based on the software breakpoint function, and implementing the action. The medium may have instructions thereon for returning to the code and continuing monitoring the code. Further, the medium may have instructions thereon for recognizing one software breakpoint function by the code to a list of known software breakpoint functions. Further, the medium may have instructions thereon for determining an action to be performed by comparing the software breakpoint function to a list of known software breakpoint functions with associated actions and using an associated action to a known software breakpoint function equivalent to the software breakpoint function as the action to be performed.

For purposes of illustration, the following example of an exemplary specific use of the present invention is provided. The present invention may be implemented as part of a self-contained ARM CPU based development board ("platform") having a CPU, display, and several peripherals. Development tools such as a compiler, a linker, and a debugger are used to write programs that run on this platform in a preferably user-friendly environment. For example, in an IDE (Integrated Development Environment), Free Software Foundation ("GNU") tools such as GCC (compiler), LD (linker), GDB (debugger) may be used. For purposes of this example, the development tools run on a standard PC. Programs to run on the platform are created on the PC and then loaded and executed on the platform. Compiler input is the source code of the program as written by a programmer and the compiler output (with linker cooperation) is the executable program image. The debugger enables the user to monitor (e.g. stop, peek, poke, etc.) the running program. The compiler and the linker can produce an image that contains information useful to the debugger, for example the machine code addresses of every source code line of the source code. Preferably debugger does not interfere with the running program, so that it can emulate exactly the same behavior from the running program regardless whether it is debugged or not. In other words, the running program is unaware that it is being debugged.

In this example, instead of placing a special instruction in the place of interest in the source code, a software call to a specially named function is issued. There is no other function of the same name in the code and the debugger always sets a breakpoint at the function of that name. Using an exemplary specially named function, _DebugBreak, what would happen would be the program would execute until it reaches the place where _DebugBreak would be called. The debugger would detect this. The name of the function, _DebugBreak, would be recognized. Then, the exemplary desired action would be to break the execution at the place where _DebugBreak returns. The net result would be that the programs breaks the execution and allows single stepping at exactly the place the programmer intended.

In this example, a similar mechanism is also used to detect the program termination. When the program "terminates," it typically enters an endless loop, effectively continuing to run, doing nothing. As the program is unaware of being debugged, it cannot (and in any case does not know how to) signal to the debugger that it terminated. The debugger then keeps running until a human operator manually stops it. To terminate the debug session once the debugged program terminated, another specially named function _DebugTerminate, is added. When the function _DebugTerminate is called the debug session is terminated.

In this example, both of the functions _DebugBreak and _DebugTerminate are always present in the runtime libraries, so the programmer does not have to write them. They are quite minimalistic, as by themselves they don't perform any action; their purpose is simply to be called to signal something to the debugger.

In this example, the action of setting breakpoints at specially named functions is done automatically by the IDE every time the program is debugged. The actions to be performed when a specially named function call is detected are performed automatically by the IDE as well. To implement this exemplary method, none of the tools (e.g. compiler, linker, debugger) need to be modified.

It should be noted that the debugging tool 104 may be implemented as a software program, as hardware (or firmware), or as a single programmable integrated circuit chip.

The use of a software breakpoint function 100 is advantageous when developing an application running on a remote target (such as a development board or a cellular telephone) that communicates via a serial connection with a development environment running on a personal computer.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A debugging tool for debugging an application program having at least one software breakpoint function and a call statement for calling said software breakpoint function, said software breakpoint function being adapted to return program control to a next program statement following said call statement when said debugging tool is not running, said debugging tool comprising:
    (a) a software breakpoint monitoring processor for monitoring said application program and recognizing said software breakpoint function, said software breakpoint function being a void function free from program instructions for performing any application program operation;
    (b) a software breakpoint action determinator for determining an action to be performed based on said software breakpoint function;
    (c) a software breakpoint action implementor for implementing said action;
    (d) said software breakpoint monitoring processor, upon recognizing said software breakpoint function, calls said software breakpoint action determinator;
    (e) said software breakpoint action determinator, in response to being called by said software breakpoint monitoring processor and upon determining said action to be performed, provides instructions to said software breakpoint action implementor; and
    (f) said software breakpoint action implementor, upon receiving said instructions from said software breakpoint action determinator, implements said action.

2. The debugging tool of claim 1 wherein predefined said software breakpoint monitoring processor monitors said application program while said application program is running.

3. The debugging tool of claim 1 wherein said software breakpoint function is a specially named void function.

4. The debugging tool of claim 1, said software breakpoint action determinator further including a lookup table.

5. A debugging tool for debugging an application program having at least one software breakpoint function and a call statement for calling said software breakpoint function, said software breakpoint function being adapted to return program control to a next program statement following said call statement when said debugging tool is not running, said debugging tool comprising:
    (a) a monitoring means;
    (b) an action determinator means;
    (c) an action implementor means;
    (d) said monitoring means, said action determinator means, and said action implementor means communicatively interconnected;
    (e) said monitoring means for monitoring said application program while said application program is running and recognizing said software breakpoint function said software breakpoint function being a void function free from program instructions for performing any application program operation, and upon recognizing said software breakpoint function, calling said action determinator means;
    (f) said action determinator means for determining an action to be performed based on said software breakpoint function and, in response to being called by said monitoring means and upon determining said action to be performed, providing instructions to said action implementor means; and
    (g) said action implementor means for implementing said action upon receiving said instructions from said action determinator means.

6. The debugging tool of claim 5 wherein user-defined said software breakpoint function is a void function free from program instructions for performing any application program operation.

7. The debugging tool of claim 5 wherein said software breakpoint function is a specially named void function.

8. The debugging tool of claim 5, said action determinator means further including a lookup table.

9. A method for debugging code having at least one software breakpoint function and a call statement for calling said at least one software breakpoint function, wherein said software breakpoint function is adapted to return control to a next code statement following said call statement when said method is not being performed, said method comprising the steps of:
    (a) receiving code having at least one software breakpoint function;
    (b) running said code for the purpose of debugging;
    (c) monitoring said code to detect the presence of said at least one software breakpoint function;
    (d) recognizing said at least one software breakpoint function, said software breakpoint function being a void function free from code instructions for performing any code operation;
    (e) determining an action to be performed based on said at least one software breakpoint function; and
    (f) implementing said action.

10. The method of claim 9, further comprising the steps of:

(a) programming said code;
(b) inserting at least one software breakpoint function into said code; and
(c) providing said code to a debugging tool.

11. The method of claim 9, further comprising the steps of returning to said code and continuing monitoring said code.

12. The method of claim 9, said step of recognizing said at least one software breakpoint function further comprising the step of comparing said code to a list of known software breakpoint functions.

13. The method of claim 9, said step of determining an action to be performed based on said at least one software breakpoint function further comprising the steps of:
   (a) comparing said at least one software breakpoint function to a list of known software breakpoint functions with associated actions; and
   (b) using an associated action to a known software breakpoint function equivalent to said at least one software breakpoint function as said action to be performed.

14. A medium readable by a device, said medium embodying a program of instructions for execution by said device to perform a method for debugging an application program having at least one software breakpoint function and a call statement for calling said software breakpoint function, said software breakpoint function being adapted to return program control to a next application program statement following said call statement when said program of instructions are not being executed, said medium comprising:
   (a) monitoring instructions on said medium;
   (b) action determinating instructions on said medium;
   (c) action implementing instructions on said medium;
   (d) said monitoring instructions, said action determinating instructions, and said action implementing instructions executable by said device;
   (e) said monitoring instructions instructing said device to monitor said application program, said software breakpoint function being a void function free from program instructions for performing any application program operation, while said application program is running and recognize any software breakpoint function in said application program, said software breakpoint function being a void function free from program instructions for performing any application program operation, and upon recognizing said software breakpoint function, to call said action determinating instructions;
   (f) said action determinating instructions instructing said device to determine an action to be performed based on said software breakpoint function and, in response to being called by said monitoring instructions and upon determining said action to be performed, to provide instructions to said action implementing instructions; and
   (g) said action implementing instructions instructing said device to implement said action upon receiving said instructions from said action determinating instructions.

15. A medium readable by a device embodying a program of instructions for execution by said device to perform a method for debugging code having at least one software breakpoint function and a call statement for calling said software breakpoint function, said software breakpoint function being adapted to return control to a next code statement following said call statement when said program of instructions are not being executed, said medium comprising:
   (a) instructions for receiving said code having at least one software breakpoint function said software breakpoint function being a void function free from program instructions for performing any application program operation, said software breakpoint function being a void function free from program instructions for performing any application program operation;
   (b) instructions for running said code for the purpose of debugging;
   (c) instructions for monitoring said code while said code is running to detect the presence of said at least one software breakpoint function;
   (d) instructions for recognizing said at least one software breakpoint function;
   (e) instructions for determining an action to be performed based on said at least one software breakpoint function; and
   (f) instructions for implementing said action.

16. The medium of claim 15, further comprising instructions for returning to said code and continuing monitoring said code.

17. The medium of claim 15, further comprising instructions for recognizing said at least one software breakpoint function further comprising the step of comparing said code to a list of known software breakpoint functions.

18. The medium of claim 15, said instructions for determining an action to be performed based on said at least one software breakpoint function further comprising:
   (a) instructions for comparing said at least one software breakpoint function to a list of known software breakpoint functions with associated actions; and
   (b) instructions for using an associated action to a known software breakpoint function equivalent to said at least one software breakpoint function as said action to be performed.

* * * * *

UNITED STATES PATENT AND TRADEMARK OFFICE
CERTIFICATE OF CORRECTION

| | |
|---|---|
| PATENT NO. | : 7,055,140 B2 |
| APPLICATION NO. | : 10/136163 |
| DATED | : May 30, 2006 |
| INVENTOR(S) | : Juraj Bystricky et al. |

It is certified that error appears in the above-identified patent and that said Letters Patent is hereby corrected as shown below:

Column 10,

Line 1, please change "The debugging tool of claim 1 wherein predefined said software breakpoint monitoring processor monitors said application program while said application program is running." to --The debugging tool of claim 1 wherein said software breakpoint function is a predefined void function.--

Column 10,

Line 22, please change 5(e) "said monitoring means for monitoring said application program while said application program is running and recognizing said software breakpoint function said software breakpoint function being a void function free from program instructions for performing any application program operation, and upon recognizing said software breakpoint function, calling said action determinator means;" to --(e) said monitoring means for: monitoring said application program and recognizing said software breakpoint function, said software breakpoint function being a void function free from program instructions for performing any application program operation, and upon recognizing said software breakpoint function, calling said action determinator means;--

Column 10,

Line 40, please change "The debugging tool of claim 5 wherein user-defined said software breakpoint function is a void function free from program instructions for performing any application program operation." to --The debugging tool of claim 5 wherein said software breakpoint function is a user-defined void function.--

Column 10,

Line 54, please change "(a) receiving code having at least one software breakpoint function;" to --receiving said code;--

UNITED STATES PATENT AND TRADEMARK OFFICE
CERTIFICATE OF CORRECTION

| | |
|---|---|
| PATENT NO. | : 7,055,140 B2 |
| APPLICATION NO. | : 10/136163 |
| DATED | : May 30, 2006 |
| INVENTOR(S) | : Juraj Bystricky et al. |

It is certified that error appears in the above-identified patent and that said Letters Patent is hereby corrected as shown below:

<u>Column 10,</u>

Line 57, please change "(c) monitoring said code to detect the presence of said at least one software breakpoint function;" to --monitoring said code to detect the presence of said at least one software breakpoint function, said software breakpoint function being a void function free from code instructions for performing any code operation;--

<u>Column 10,</u>

Line 59, please change "(d) recognizing said at lest one software breakpoint function, said software breakpoint function being a void function free from code instructions for performing any code operation;" to --recognizing said at least one software breakpoint function;--

<u>Column 11,</u>

Line 37, please change (e) "said monitoring instructions instructing said device to monitor said application program, said software breakpoint function being a void function free from program instructions for performing any application program operation, while said application is running and recognize any software breakpoint function in said application program, said software breakpoint function being a void function free from program instructions for performing any application program operation, and upon recognizing said software breakpoint function, to call said action determinating instructions;" to --said monitoring instructions instructing said device to: monitor said application program and recognize any software breakpoint function in said application program, said software breakpoint function being a void function free from program instructions for performing any application program operation, and upon recognizing said software breakpoint function, to call said action determinating instructions;--

UNITED STATES PATENT AND TRADEMARK OFFICE
CERTIFICATE OF CORRECTION

PATENT NO. : 7,055,140 B2
APPLICATION NO. : 10/136163
DATED : May 30, 2006
INVENTOR(S) : Juraj Bystricky et al.

It is certified that error appears in the above-identified patent and that said Letters Patent is hereby corrected as shown below:

Column 12,

Line 13, please change "(a) instructions for receiving said code having at least one software breakpoint function said software breakpoint function being a void function free from program instructions for performing any application program operation, said software breakpoint function being a void function free from program instructions for performing any application program operation;" to --instructions for receiving said code having at least one software breakpoint function, said software breakpoint function being a void function free from program instructions for performing any application program operation;--

Column 12,

Line 22, please change (c) "instructions for monitoring said code while said code is running to detect the presence of said at least one software breakpoint function;" to --instructions for monitoring said code to detect the presence of said at least one software breakpoint function;--

Signed and Sealed this

Thirtieth Day of June, 2009

JOHN DOLL
*Acting Director of the United States Patent and Trademark Office*